(12) United States Patent
Miller et al.

(10) Patent No.: US 7,369,721 B2
(45) Date of Patent: May 6, 2008

(54) OPTICAL IMAGING SYSTEM WITH OPTICAL DELAY LINES

(75) Inventors: Lee D Miller, Portishead (GB); Martyn R Jennings, Bradley Stoke (GB)

(73) Assignee: MBDA UK Limited, Stevenage, Hertfordshire (GB)

( * ) Notice: Subject to any disclaimer, the term of this patent is extended or adjusted under 35 U.S.C. 154(b) by 52 days.

(21) Appl. No.: 10/518,031

(22) PCT Filed: Sep. 24, 2004

(86) PCT No.: PCT/GB2004/004061

§ 371 (c)(1),
(2), (4) Date: Dec. 14, 2004

(87) PCT Pub. No.: WO2005/031385

PCT Pub. Date: Apr. 7, 2005

(65) Prior Publication Data

US 2006/0159391 A1    Jul. 20, 2006

(30) Foreign Application Priority Data

Sep. 26, 2003  (EP) .................. 03256086
Sep. 26, 2003  (GB) .................. 0322564.6

(51) Int. Cl.
*G02B 6/26* (2006.01)
(52) U.S. Cl. .................. 385/27; 385/115
(58) Field of Classification Search ............. 385/27, 385/115
See application file for complete search history.

(56) References Cited

U.S. PATENT DOCUMENTS

| 4,182,935 | A |   | 1/1980  | Chown |
| 4,379,409 | A | * | 4/1983  | Primbsch et al. ............. 73/643 |
| 4,432,599 | A | * | 2/1984  | McMahon ............. 250/227.14 |
| 4,630,923 | A | * | 12/1986 | Tans et al. .................. 356/301 |

(Continued)

FOREIGN PATENT DOCUMENTS

EP      1 154 639      11/2001

(Continued)

OTHER PUBLICATIONS

K. Horikawa et al, "Photonic Switched True Time Delay Beam Forming Network Integrated on Silica Waveguide Circuits" *IEEE MTT-S Digest* vol. 1, 1995, pp. 65-68, no month.

(Continued)

*Primary Examiner*—Ellen E. Kim
(74) *Attorney, Agent, or Firm*—Nixon & Vanderhye P.C.

(57) ABSTRACT

An electromagnetic signal processing system (10) comprises a plurality of optical fiber arrays (11, 12, 13, 14, 15 and 16) each having a cluster of optical fibers with their one ends (40) oriented to receive electromagnetic radiation from free-space, or to transmit electromagnetic radiation into free-space. Received electromagnetic radiation passes through respective array outputs (21, 22, 23, 24, 25 and 26) and optical delays (50, 51; 55, 56; 65) to the input (68) of a signal detector (69). Transmitted electromagnetic radiation from sources (71, 72) passes through optical delays (50, 51; 55, 56) to array inputs (21, 22, 23, 24, 25 and 26) so that the one ends (40) of the optical fibers transmit the electromagnetic radiation into free-space.

23 Claims, 9 Drawing Sheets

U.S. PATENT DOCUMENTS

| | | | |
|---|---|---|---|
| 4,699,513 A | 10/1987 | Brooks et al. | |
| 5,127,078 A * | 6/1992 | Terry et al. | 385/116 |
| 5,337,325 A * | 8/1994 | Hwang | 372/36 |
| 5,887,102 A * | 3/1999 | Mueller et al. | 385/115 |
| 6,011,885 A * | 1/2000 | Dempewolf et al. | 385/34 |
| 6,097,858 A * | 8/2000 | Laor | 385/16 |
| 6,246,822 B1 | 6/2001 | Kim et al. | |
| 6,249,381 B1 * | 6/2001 | Suganuma | 359/618 |
| 6,418,267 B1 * | 7/2002 | Lowry | 385/147 |
| 6,556,285 B1 * | 4/2003 | Dickson | 356/121 |
| 6,610,974 B1 * | 8/2003 | Hunt et al. | 250/227.22 |
| 6,754,409 B2 * | 6/2004 | Laor et al. | 385/16 |
| 6,817,746 B2 * | 11/2004 | Steiner et al. | 362/556 |
| 6,850,671 B2 * | 2/2005 | Carnevale et al. | 385/39 |
| 2002/0020806 A1 * | 2/2002 | Almi | 250/227.2 |
| 2005/0180706 A1 * | 8/2005 | Jones | 385/115 |

FOREIGN PATENT DOCUMENTS

| | | |
|---|---|---|
| GB | 2 317 768 | 4/1998 |
| GB | 2 384 126 | 7/2003 |
| WO | WO 02/29436 | 4/2002 |

OTHER PUBLICATIONS

P.C. Ku et al, "Variable Semiconductor All-Optical Buffer" *Electronics Letters* vol. 38, No. 24, Nov. 2002.

* cited by examiner

OPTICAL IMAGING SYSTEM WITH OPTICAL DELAY LINES

This application is the U.S. national phase of international application PCT/GB2004/004061, filed in English on 24 Sep. 2004, which designated the U.S. PCT/GB2004/004061 claims priority to GB Application No. 0322564.6 filed 26 Sep. 2003 and EP Application No. 03256086.4 filed 26 Sep. 2003. The entire contents of these applications are incorporated herein by reference.

This invention relates to an electromagnetic signal processing system and more specifically, but not exclusively, to a system of processing an optical signal.

WO02/29436 teaches that a laser-radar receiver should comprise an array of optical fibres which receive electromagnetic radiation from free-space and are connected to at least one radiation detector, each optical fibre having differing physical characteristics which result in known delays in the transmission time of pulsed electromagnetic radiation. Such delays are conveniently achieved by using optical fibres of differing lengths so that they operate as delay lines. Arrays of 3×3 optical fibres are taught, with each optical fibre connected to a single avalanche photo-diode (APD).

According to one aspect of the present invention, an electromagnetic signal processing system comprises a plurality of optical fibre arrays, each optical fibre array having a cluster of optical fibres with their one ends oriented to receive electromagnetic radiation from free-space and arranged to transmit the electromagnetic radiation to an array output, and the array outputs are connected to transmit the electromagnetic radiation in sequence to a signal detector input. In this manner the outputs from a plurality of optical fibre arrays can be fed into a single signal detector. In each optical fibre array the cluster of optical fibres serve as time delays, the time delay being proportional to the individual fibre length.

Preferably, the sequential connection of the array outputs is through at least one optical delay. In this manner the signal detector is enabled to discriminate between the array outputs whilst allowing trade-offs in the length of the optical fibre and consequently a reduction in the mass, volume and cost.

The optical fibre arrays may be arranged as a plurality of array groups, each array group having a respective array group output, and the array group outputs are connected in series by respective optical delays to the signal detector input. In this manner the signal detector is enabled to discriminate between the array group outputs. Alternatively, the optical fibre arrays may be arranged as a plurality of array groups, each array group having a respective array group output, and an array group output of one array group is connected to an input to another array group. In this case the connection of the array group output from one array group to the input of the other array group may be through an optical delay. In this manner the signal detector is enabled to discriminate between the array group outputs.

The optical fibre arrays may be arranged as a plurality of array groups, each array group having a respective array group output, and an optical switch is arranged operatively between the array group outputs and the signal detector input. In this manner radiation from one or more of the array group outputs may be connected, or disconnected, to the signal detector input.

A source of electromagnetic radiation may be arranged to radiate discrete pulses of radiation through the array outputs towards the one ends of the optical fibres for transmission into free-space. In this manner the system is able to radiate electromagnetic radiation through the one ends of the optical fibres as well as receiving electromagnetic radiation for the signal detector.

At least two of the array group outputs may include respective source of electromagnetic radiation arranged to radiate discrete pulses of radiation through the array group outputs towards the one ends of the optical fibres for transmission into free-space, and each source of electromagnetic radiation is arranged so that it may produce its discrete pulses of radiation with different characteristics. The different characteristics could, for example, be direction, timing, wavelength, or modulation format.

According to another aspect of the invention, an electromagnetic signal processing system comprises a plurality of optical fibres arrays, each optical fibre array having a cluster of optical fibres with their one ends oriented to transmit electromagnetic radiation into free-space and arranged to receive the electromagnetic radiation from an array input, and the array inputs are connected to receive the electromagnetic radiation in sequence from a source of electromagnetic radiation.

The sequential connection of the array inputs is preferably through at least one optical delay.

The optical fibre arrays may be arranged as a plurality of array groups, each array group having a respective array group input, the array group inputs being connected in series by respective optical delays to the source of electromagnetic radiation. Alternatively, the optical fibre arrays may be arranged as a plurality of array groups, each array group having a respective array group input, an array group input of one array being connected to an output of another array group. In the latter case, the connection of the array group input from one array group to the output of the other array group may be through an optical delay.

The optical fibre arrays may be arranged as a plurality of array groups, each array group having a respective array group input, an optical switch being arranged operatively between the array group inputs and the source of electromagnetic radiation.

At least one of the optical delays is preferably provided by a length of optical fibre. Indeed all of the optical delays may be in the form of lengths of optical fibre. However, any convenient form of optical delay may be used subject, of course, to the operational parameters of the electromagnetic signal processing system. For instance, optical delay devices may be provided using the technology reported in 'Catch the wave', published on 5 Jun. 1999 in New Scientist Vol. 162, issue 2189, page 28 or in 'Variable semiconductor all-optical buffer' by P C Ku, C J Chang-Hasnain and S L Chuang published on 21 Nov. 2002 in Electronics Letters Vol. 38, No. 24, pages 1581-1583.

The invention will now be described, by way of example only, with reference to the accompanying drawings, in which.

Figure 1:
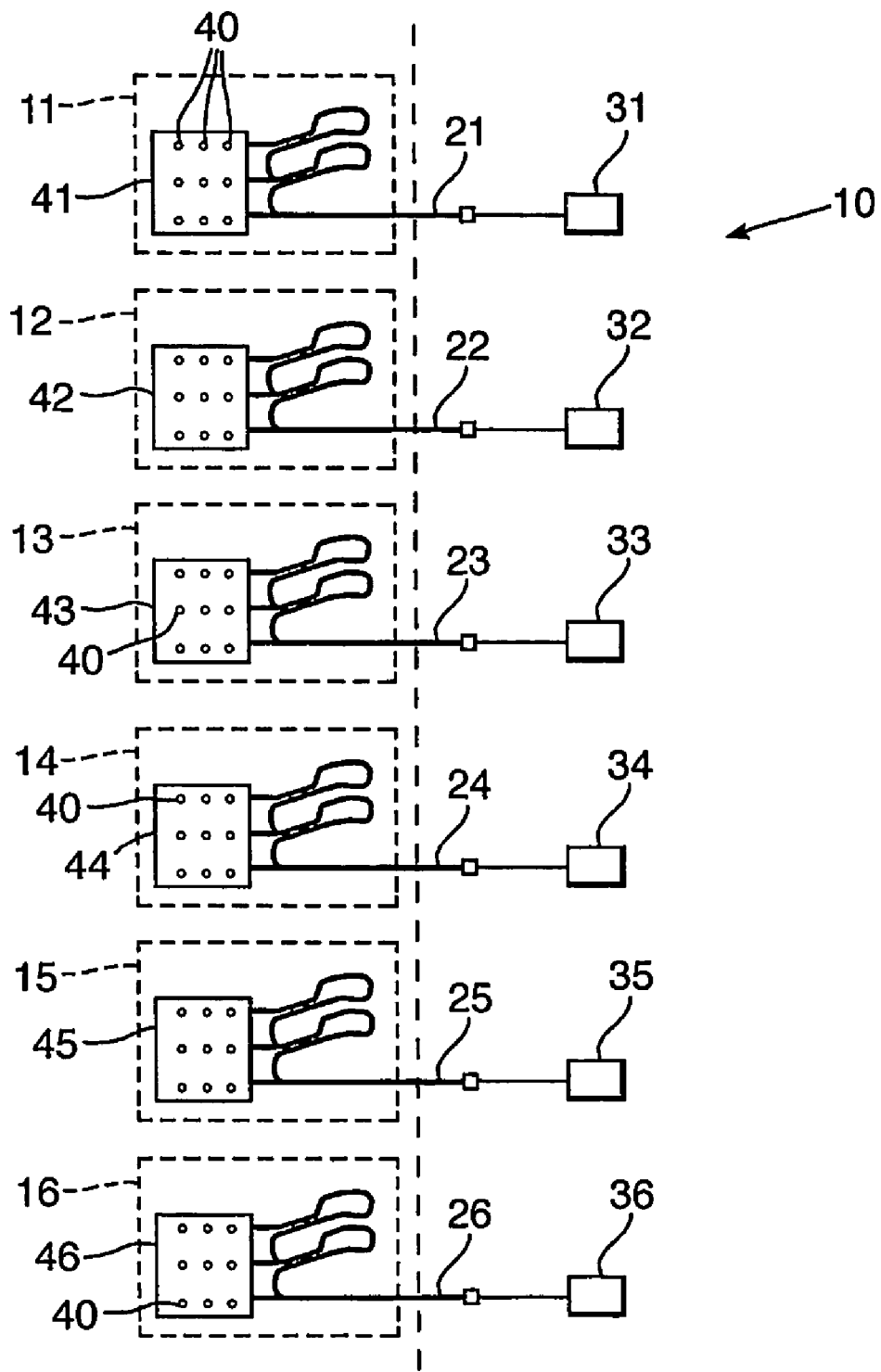
FIG. 1 is a diagram of a state of the art electromagnetic signal processing system.

In FIG. 1 an electronic signal processing system 10 comprises six individual optical fibre arrays 11, 12, 13, 14, 15 and 16 which are arranged to receive electromagnetic radiation from free-space and have respective array outputs 21, 22, 23, 24, 25, and 26 connected to respective signal detectors 31, 32, 33, 34, 35 and 36.

Each optical fibre array 11, 12, 13, 14, 15 and 16 comprises a cluster of nine optical fibres. One end of each fibre is depicted by the small circles 40, each set of nine fibres being positively located in predetermined relative positions in respective array boards 41, 42, 43, 44, 45 and 46 which, in use, would each be mounted to face a direction from which an electromagnetic signal may be received from free-space. Although the array boards 41, 42, 43, 44, 45 and 46 are all shown as being rectangular with the nine optical fibres 40 arranged equally-spaced in a 3×3 matrix, each array board 41, 42, 43, 44, 45 and 46 may be of any convenient shape and its cluster of optical fibres may be any required number arranged in any suitable manner to receive electromagnetic radiation. The array boards may face either in the same direction or may be oriented to receive electromagnetic radiation from different directions. Instead of being mounted in the array boards, the optical fibres may be mounted directly through any convenient support structure.

Each cluster of optical fibres 40 is operatively connected to the respective array output 21, 22, 23, 24, 25 and 26 for instance in one of the sequential arrangements taught by WO 02/29436. Any electromagnetic radiation received through the one end of any of the optical fibres 40 will therefore be transmitted to the respective signal detector 31, 32, 33, 34, 35 and 36 for identification and/or processing.

In the drawings, the optical fibre arrays 11, 12, 13, 14, 15 and 16 are depicted in a simplified manner with the three optical fibres 40 for only the right-hand column being drawn. It should be understood that all nine optical fibres 40 of each optical fibre array are sequentially connected to the respective array output so that there is an inbuilt time delay between the transmission by each optical fibre 40. In this manner the respective signal detector 31, 32, 33, 34, 35 or 36 is able to identify the optical fibre from which an electromagnetic signal is received.

The state of the art, as described with reference to FIG. 1, teaches the use of multiple optical fibre arrays 11, 12, 13, 14, 15 and 16 which receive electromagnetic signals from free-space and transmit them, through optical fibres and the respective array output 21, 22, 23, 24, 25 or 26, to the respective signal detector 31, 32, 33, 34. 35 or 36. This form of electromagnetic signal processing system requires the provision of a significant number of signal detectors (six signal detectors in FIG. 1) and incurs a cost and weight penalty together with the need to assess and co-ordinate the information gleaned from the electromagnetic signals by the multiple detectors.

Figure 2:
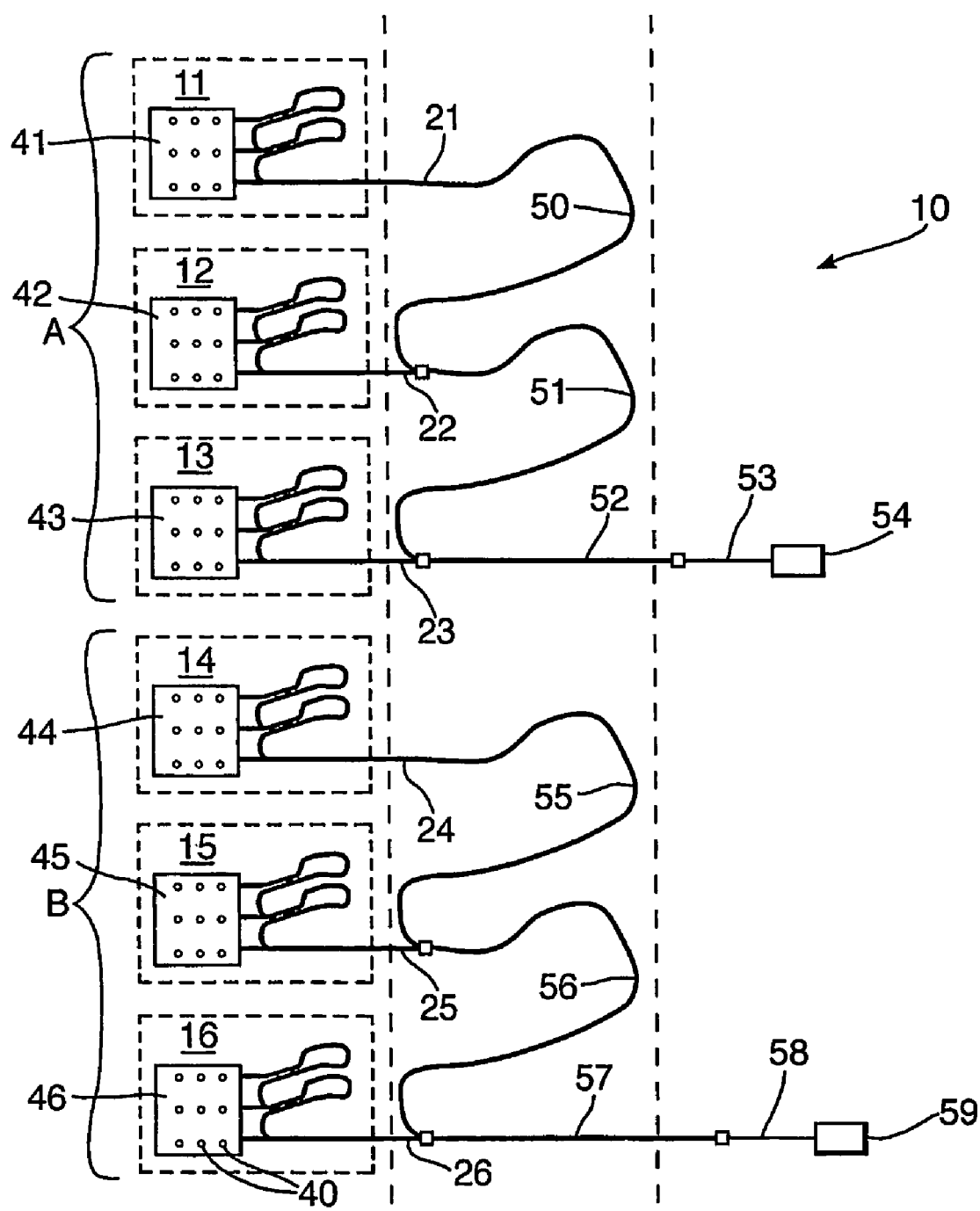
FIG. 2 is a diagram illustrating a two stage electromagnetic signal processing system taught by the present invention.

With reference to FIG. 2, the optical fibre arrays are of the same construction as described in FIG. 1, but the optical fibre arrays 11, 12 and 13 are arranged as an array group A with their array outputs 21, 22 and 23 sequentially connected by optical delays 50 and 51 to a joint output 52 for transmitting electromagnetic signals to an input 53 of a single signal detector 54.

In this manner, the transmission to the signal detector 54 of an electromagnetic signal received by the optical fibre delay 11, will be delayed by both optical delay 50 and optical delay 51, whereas any electromagnetic signal received by the optical fibre array 12 will be delayed by the optical delay 51.

Consequently, the detector 54 will receive a sequential cascade of signals, a first set being received by the optical fibre array 13, the second set being received by the optical fibre array 12 but delayed by the optical delay 51, and the third set being received by the optical fibre array 11 and being delayed by the optical delays 50 and 51. By cascading the receipt of electromagnetic signals in this manner, the signal detector 54 is able to discriminate between electromagnetic signals received by the three optical fibre arrays 11, 12 and 13.

From FIG. 2 it will be noted that the optical fibre arrays 14, 15 and 16 are arranged as a second array Group B with their array outputs 24, 25 and 26 sequentially connected by optical delays 55 and 56 to a joint output 57 for transmitting electromagnetic signals to an input 58 of a signal detector 59.

Array Group B is therefore a duplicate of array Group A and operates in exactly the same manner. The optical delays 50, 51, 55 and 56 enable only two signal detectors 54 and 59 to process all of the electromagnetic signals received from the six optical fibre arrays 11, 12, 13, 14, 15 and 16. The dashed vertical lines indicate that the system is formed in two stages, the first stage being the six optical fibre arrays comprising the state of the art as shown in FIG. 1, the second stage being the four delay lines 50, 51, 55 and 56. The provision of the second stage reduces the number of signal detectors required. The number of optical fibre arrays forming a group (such as Group A or Group B) can be increased or decreased as desired within the capabilities of the associated signal detector 54, 59.

Although FIG. 2 shows the arrangement of delay lines 50, 51, 55 and 56 in the second stage, further stages of delay lines may be used. Indeed a large number of stages, ten or more, could be used.

The reference numerals used in describing FIG. 2 will be used in FIGS. 3-9 to denote equivalent components having equivalent functions except as hereinafter described.

Figure 3:
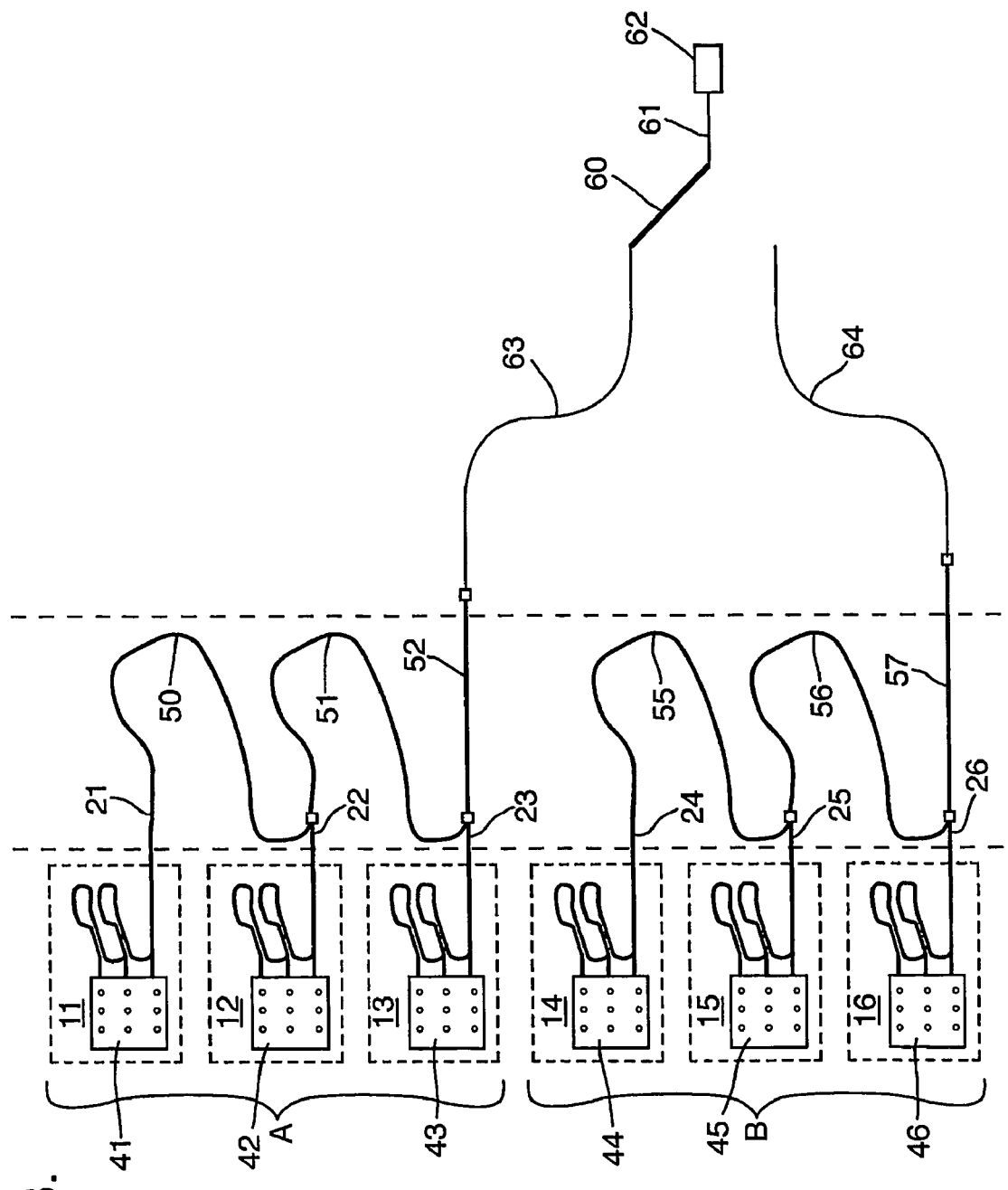
FIG. 3 is a diagram illustrating a modification to the system of FIG. 2.

FIG. 3 illustrates the use of an optical switch 60 to select the connection of the joint outputs 52 and 57 to an input 61 of a single signal detector 62, the optical switch 60 being operative to connect the signal detector 62 either to optical fibre 63 (as shown) to receive electromagnetic signals from Group A, or to optical fibre 64 to receive signals from Group B.

Figure 4:
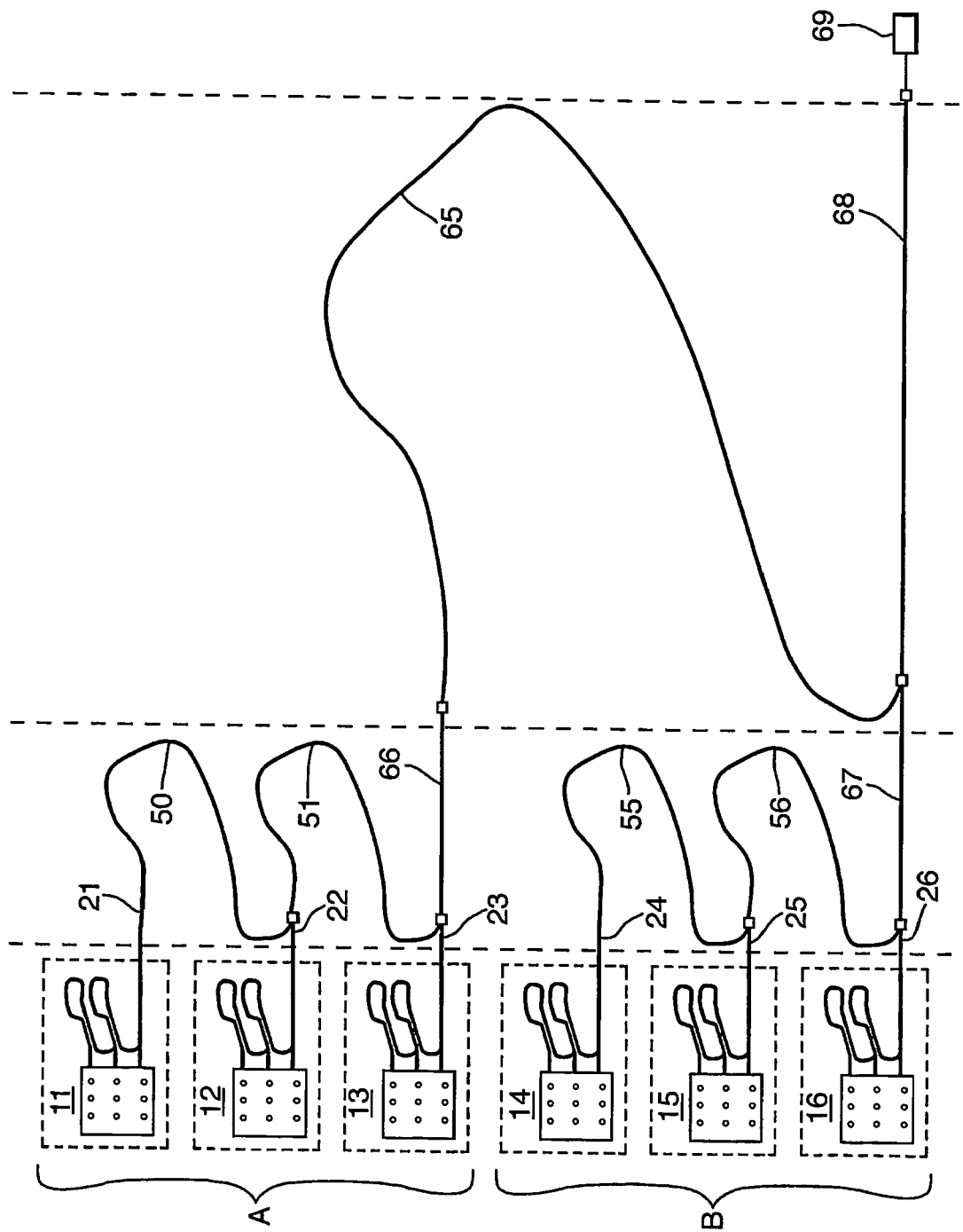
FIG. 4 is a diagram illustrating a three stage electromagnetic signal processing system taught by the present invention.

FIG. 4 illustrates the addition of a third stage comprising an optical delay 65 connecting array group outputs 66 and 67 sequentially to an input 68 to a single detector 69. The optical delay 65 is chosen such that the signals from Group A will reach the signal detector 69 after the signals from Group B.

Figure 5:
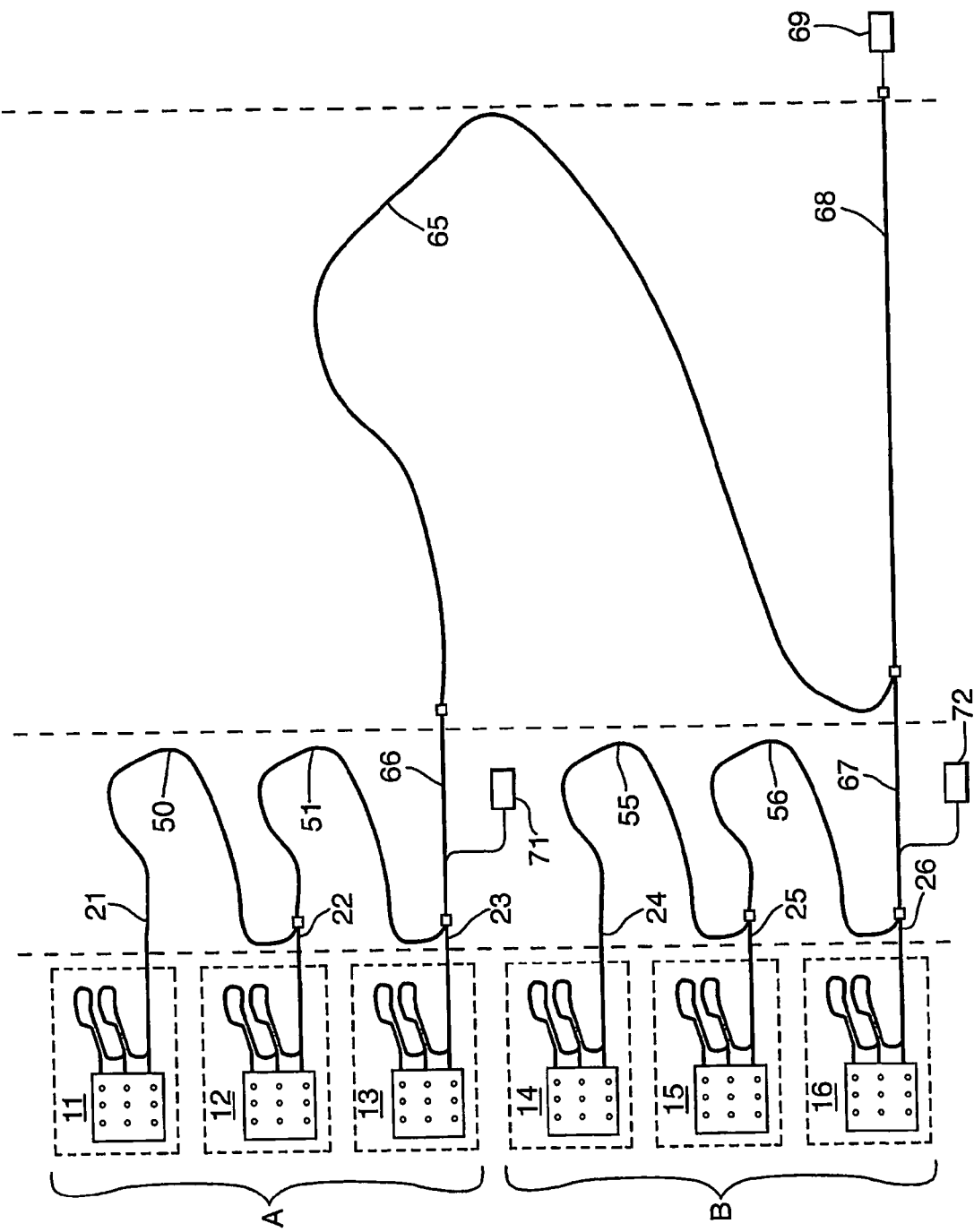
FIG. 5 shows a modification to the system of FIG. 4 to enable the system to radiate electromagnetic radiation.

FIG. 5 is a modification of the system just described with reference to FIG. 4, the modification comprising the incorporation of two electromagnetic radiation sources 71 and 72 so that source 71 can radiate electromagnetic radiation through the optical fibre arrays of Group A towards the one ends of the optical fibres 40 which transmit the electromagnetic radiation into free-space, and source 72 can radiate electromagnetic radiation through the optical fibre arrays of Group B towards the one ends of the optical fibres 40 which will also transmit the electromagnetic radiation into free-space. In this manner, the array outputs 21, 22, 23, 24, 25 and 26 become array inputs and the various time delays in Groups A and B code the electromagnetic radiation transmitted into free-space. When the radiation sources 71 and 72 are used in conjunction with a radiation detector 69 as shown, there is the benefit that only the region that the detector is viewing will be illuminated.

Figure 6:
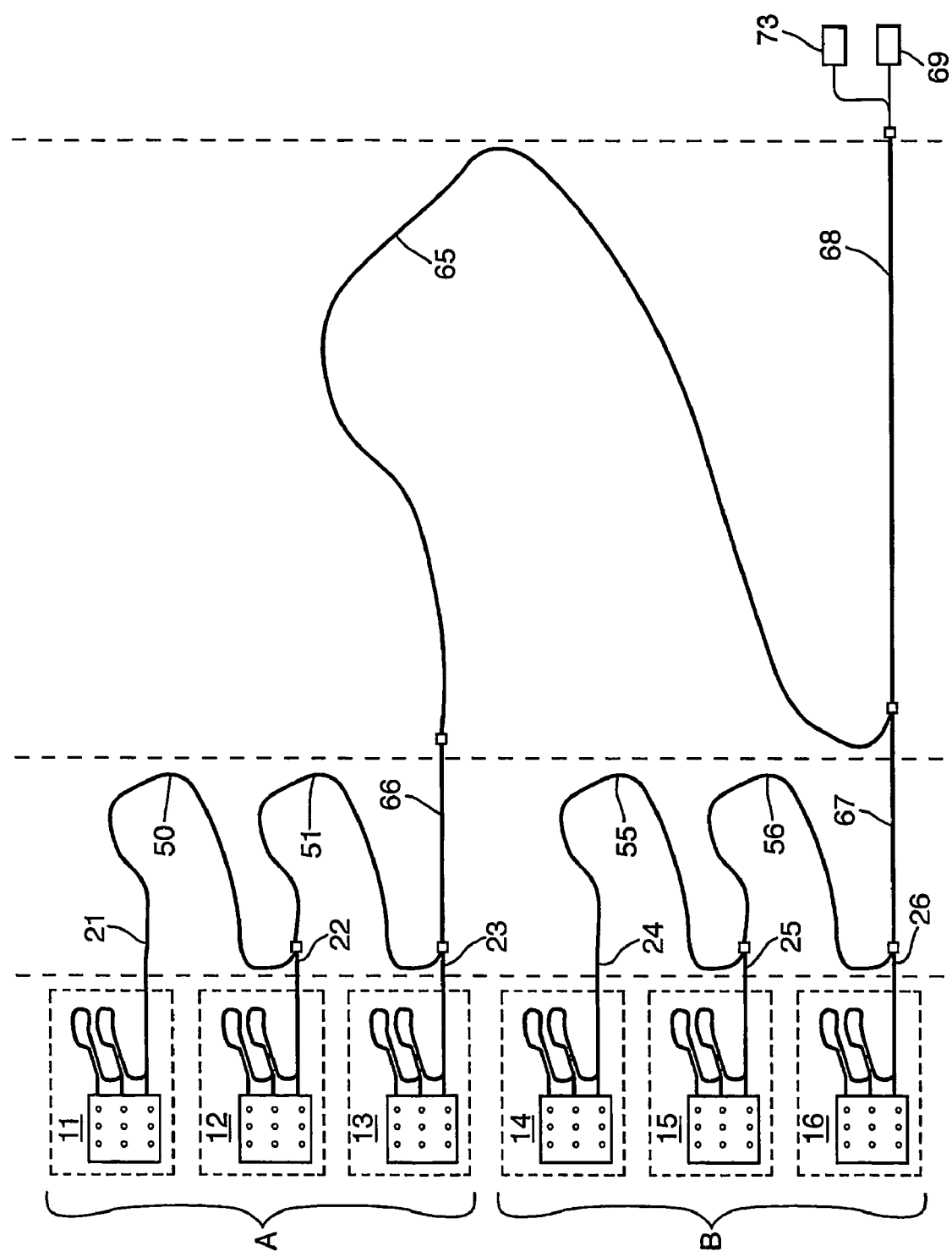
FIG. 6 illustrates a modification of the system shown in FIG. 5.

FIG. 6 illustrates a modification of the system taught in FIG. 5 so that only one electromagnetic radiation source 73 is required for transmitting electromagnetic radiation into free-space through all of the optical fibre arrays of Groups A and B. It will be noted that the input 68 to the signal detector 69 additionally serves as an output from the source 73, the array group outputs 66 and 67 become array group inputs from the electromagnetic radiation source 73, and the optical delay 65 operates to delay the transmission of the electromagnetic radiation to the array group input 66 to Group A.

Figure 7:
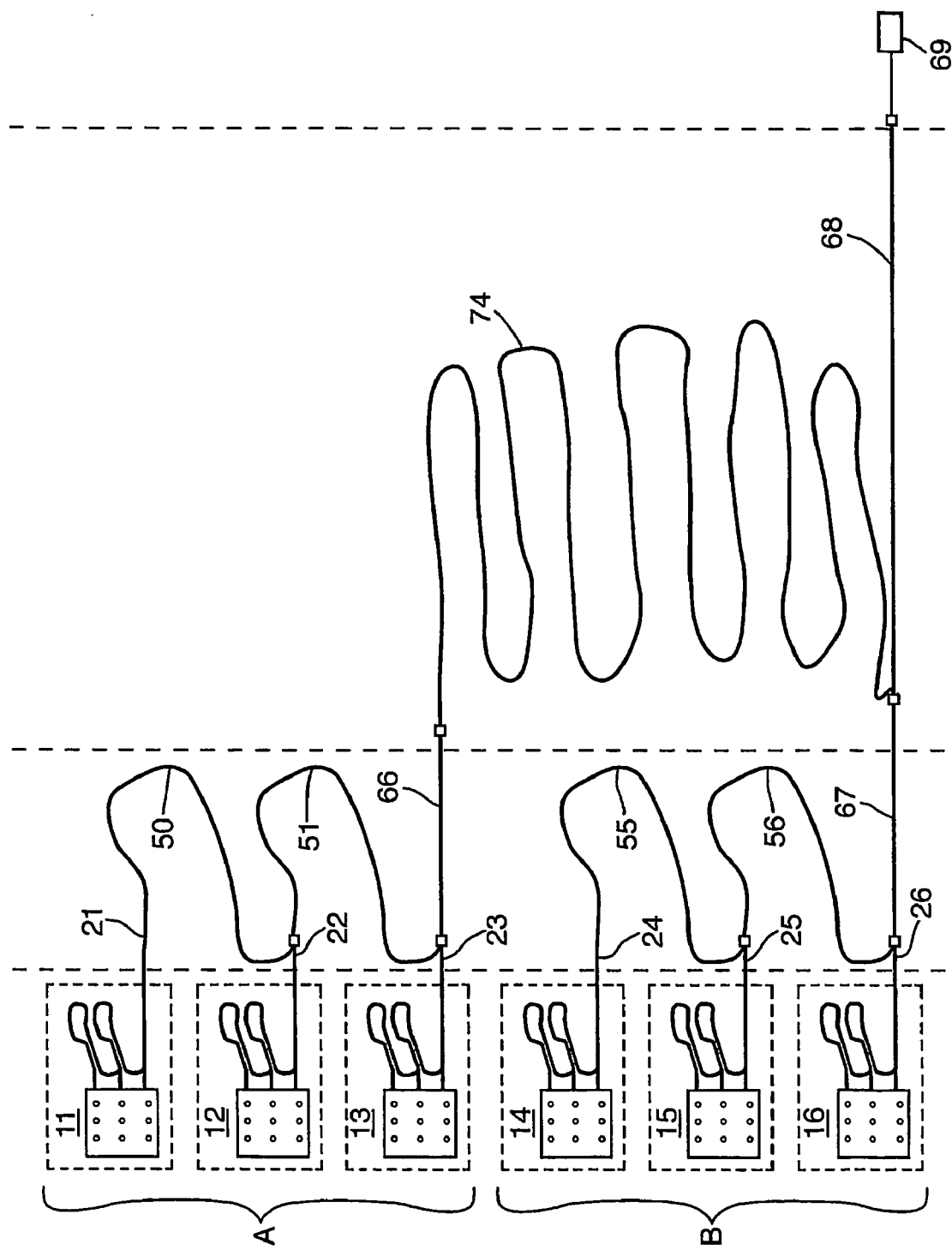
FIG. 7 is a diagram illustrating a modification of the system shown in FIG. 4.

FIG. 7 diagrammatically illustrates how the optical delay 65 of FIG. 4 can be replaced by a much longer optical delay 74 to increase the time delay between the signals transmitted by the array group outputs 66 and 67. The increased time delay separates 'packages' of data, in time, from each optical fibre array by such a large amount that ambiguities in the information received by the signal detector 69 are prevented.

Figure 8:
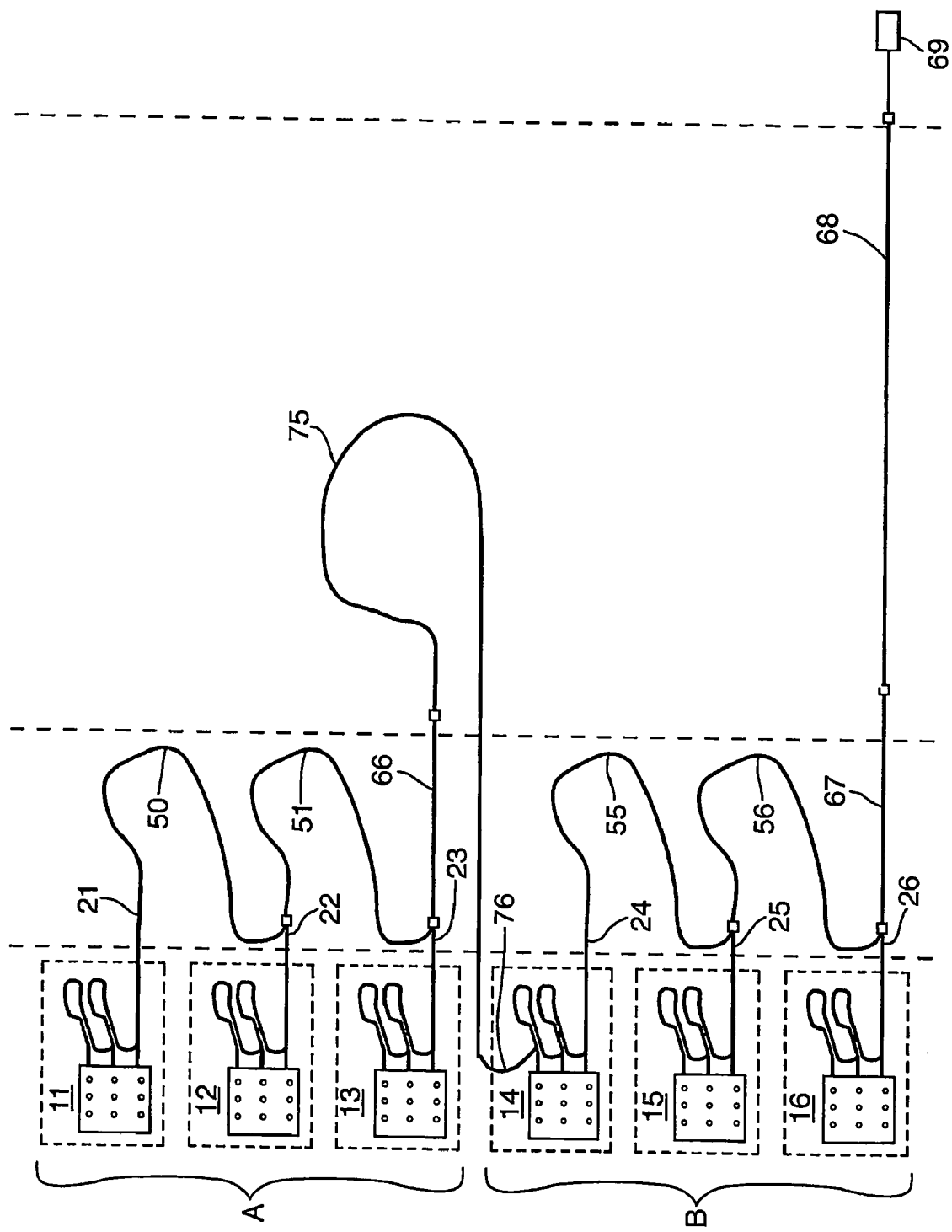
FIG. 8 is a diagram of an electromagnetic signal processing system having three stages taught by the present invention.

In FIG. 8 a third stage optical delay 75 is positioned to interconnect the array group output 66 of Group A to an input 76 to the array Group B so that the signal from array group output 66 is delayed by the entire optical system of Group B. In this manner, the output signals from the six optical fibre arrays 11, 12, 13, 14, 15 and 16 are cascaded into the input 68 to the signal detector 69, the optical delay 75 being used to enable the signal detector 69 to differentiate between the signals of Group A and B. The feeding of outputs from earlier groups back into the inputs of later groups is possible because all of the radiation from the earlier stage leaves at approximately the same time.

Figure 9:
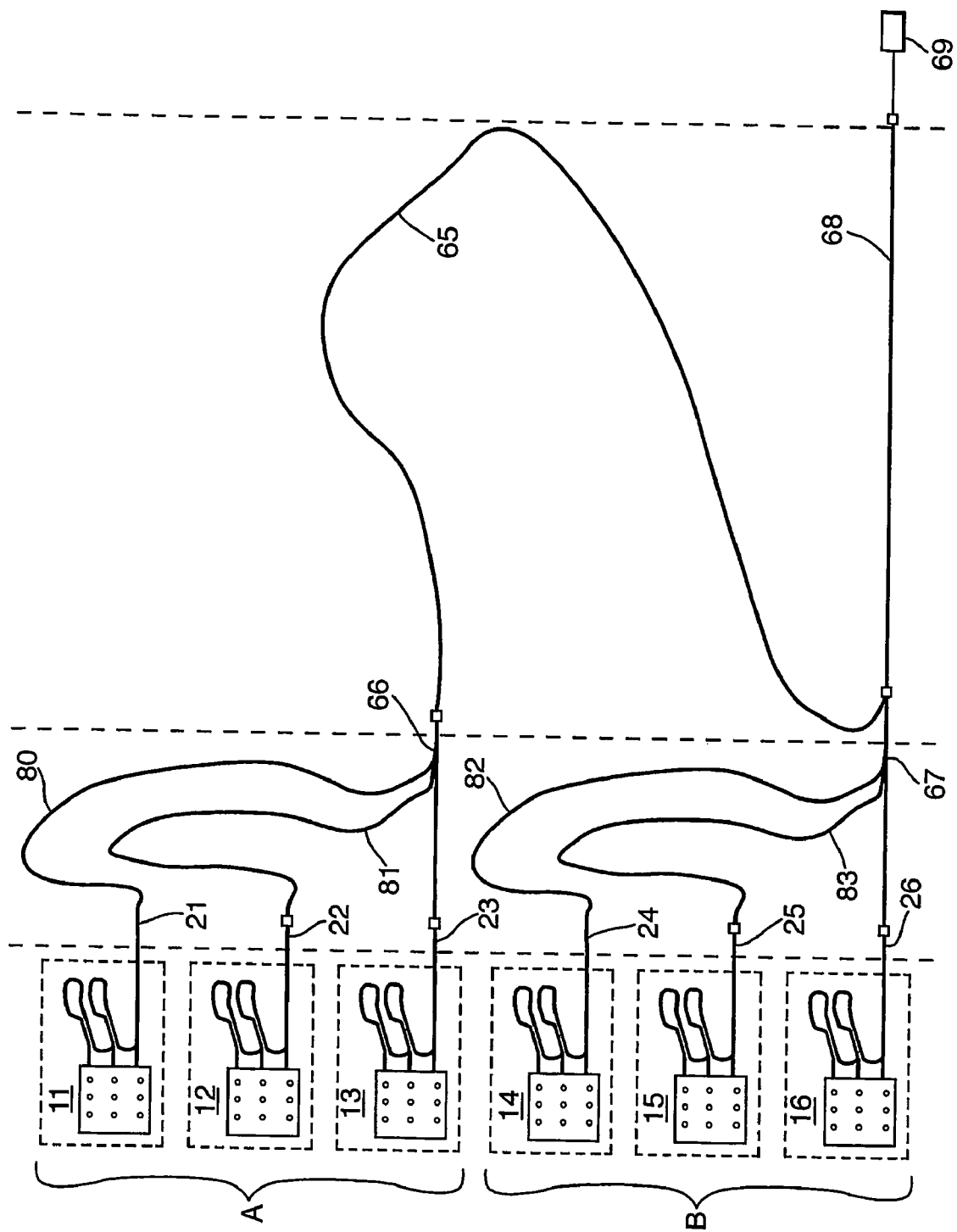
FIG. 9, is a diagram illustrating another three stage electromagnetic signal processing system taught by the present invention.

FIG. 9 shows that, instead of having optical delay lines that feed into each other, the stages could have individual delay lines of differing lengths to achieve the same objectives. Thus it will be seen that the array outputs 21 and 22 of optical fibre arrays 11 and 12 are connected in parallel by respective optical delay lines 80 and 81 to the array group output 66. Similarly, the array outputs 24 and 25 of the optical fibre arrays 14 and 15 are connected in parallel to the array group output 67 of Group B by delay lines 82 and 83. This arrangement reduces the number of fibre couplers required but increases the length of optical fibre needed.

Despite the parallel connection of the optical delay lines 80 and 81 to the array group output 66, the array outputs 21, 22 and 23 are connected to transmit electromagnetic radiation in sequence to the array group output 66, this sequencing being achieved by the different delays caused by the optical delay lines 80 and 81. Similarly, the optical delay lines 82 and 83 ensure that the array outputs 24, 25 and 26 are connected to transmit electromagnetic radiation in sequence to the array group output 67.

The FIG. 9 system may be varied by replacing the optical delay lines 81, 82 83 and 84 with optical processors which are arranged to tag the electromagnetic signals before arrival at the array group outputs 66, 67. In this manner the signal detector 69 is enabled to distinguish the signals from each of the fibre arrays 11, 12, 13, 14, 15 and 16.

The invention claimed is:

1. An electromagnetic signal processing system comprising: a plurality of optical fibre arrays (1, . . . N), each optical fibre array having a cluster of optical fibres with their one ends oriented to receive electromagnetic radiation from free-space and arranged to sequentially transmit the electromagnetic radiation to an array output;
    a signal detector, said signal detector having an input;
    means for optically connecting each array output to a subsequent array output through at least one optical delay; and
    means for optically connecting the $N^{th}$ array output to said signal detector input.

2. An electromagnetic signal processing system, according to claim 1, in which the optical fibre arrays are arranged as a plurality of array groups, each array group has a respective array group output, and the array group outputs are connected in series by respective optical delays to the signal detector input.

3. An electromagnetic signal processing system, according to claim 2, in which at least two of the array group outputs include a respective source of electromagnetic radiation arranged to radiate discrete pulses of radiation through their respective array group outputs towards the one end of the optical fibres for transmission into free-space, and each source of electromagnetic radiation is arranged so that it may produce its discrete pulses of radiation with different characteristics.

4. An electromagnetic signal processing system, according to claim 1, in which the optical fibre arrays are arranged as a plurality of array groups, each array group has a respective array group output, and an array group output of one array group is connected to the first optical fibre array of another array group.

5. An electromagnetic signal processing system, according to claim 4, in which the connection of the array group output from one array group to the first array of the other array group is through an optical delay.

6. An electromagnetic signal processing system, according to claim 1, in which the optical fibre arrays are arranged as a plurality of array groups, each array group has a respective array group output, and an optical switch is arranged operatively between the array group outputs and the signal detector input.

7. An electromagnetic signal processing system, according to claim 1, including a source of electromagnetic radiation arranged to radiate discrete pulses of radiation through the array outputs towards the one end of the optical fibres for transmission into free-space.

8. An electromagnetic signal processing system, according to claim 1, in which at least one of the optical delays is provided by a length of optical fibre.

9. A laser-radar including an electromagnetic signal processing system according to claim 1.

10. An electromagnetic signal processing system comprising:
    a plurality of optical fibre arrays (1, . . . N), each optical fibre array having a cluster of optical fibres with their one ends oriented to transmit electromagnetic radiation into free-space and arranged to sequentially receive the electromagnetic radiation from an array input;
    a source of electromagnetic radiation;
    means for optically connecting each array input to a subsequent array input through at least one optical delay; and
    means for connecting the $N^{th}$ array input to the source of electromagnetic radiation.

11. An electromagnetic signal processing system, according to claim 10, in which the optical fibre arrays are arranged as a plurality of array groups, each array group has a respective array group input, and the array group inputs are connected in series by respective optical delays to the source of electromagnetic radiation.

12. An electromagnetic signal processing system, according to claim 10, in which the optical fibre arrays are arranged as a plurality of array groups, each array group has a respective array group input, and an array group input of one array is connected to the first optical fibre array of another array group.

13. An electromagnetic signal processing system, according to claim 12, in which the connection of the array group input from one array group to the output of the other array group is through an optical delay.

14. An electromagnetic signal processing system, according to claim 10, in which the optical fibres arrays are arranged as a plurality of array groups, each array group has a respective array group input, and an optical switch is arranged operatively between the array group inputs and the source of electromagnetic radiation.

15. An electromagnetic signal processing system, according to claim 10, in which at least one of the optical delays is provided by a length of optical fibre.

16. An electromagnetic signal processing system comprising a plurality of optical fibre arrays, each optical fibre array having a cluster of optical fibres with their one ends oriented to receive electromagnetic radiation from free-space and arranged to transmit the electromagnetic radiation to an array output, and the array outputs are connected to transmit the electromagnetic radiation in sequence to a signal detector input, in which the optical fibre arrays are arranged as a plurality of array groups, each array group has a respective array group output, and the array group outputs are connected in series by respective optical delays to the signal detector input.

17. An electromagnetic signal processing system, according to claim 16, in which at least two of the array group outputs include a respective source of electromagnetic radiation arranged to radiate discrete pulses of radiation through the array group outputs towards the one end of the optical fibres for transmission into free-space, and each source of electromagnetic radiation is arranged so that it may produce its discrete pulses of radiation with different characteristics.

18. An electromagnetic signal processing system comprising a plurality of optical fibre arrays, each optical fibre array having a cluster of optical fibres with their one ends oriented to receive electromagnetic radiation from free-space and arranged to transmit the electromagnetic radiation to an array output, and the array outputs are connected to transmit the electromagnetic radiation in sequence to a signal detector input, in which the optical fibre arrays are arranged as a plurality of array groups, each array group has a respective array group output, and an array group output of one array group is connected to an input to another array group.

19. An electromagnetic signal processing system comprising a plurality of optical fibre arrays, each optical fibre array having a cluster of optical fibres with their one ends oriented to receive electromagnetic radiation from free-space and arranged to transmit the electromagnetic radiation to an array output, and the array outputs are connected to transmit the electromagnetic radiation in sequence to a signal detector input, in which the optical fibre arrays are arranged as a plurality of array groups, each array group has a respective array group output, and an optical switch is arranged operatively between the array group outputs and the signal detector input.

20. An electromagnetic signal processing system comprising a plurality of optical fibre arrays, each optical fibre array having a cluster of optical fibres with their one ends oriented to transmit electromagnetic radiation into free-space and arranged to receive the electromagnetic radiation from an array input, and the array inputs are connected to receive the electromagnetic radiation in sequence from a source of electromagnetic radiation, in which the optical fibre arrays are arranged as a plurality of array groups, each array group has a respective array group input, and the array group inputs are connected in series by respective optical delays to the source of electromagnetic radiation.

21. An electromagnetic signal processing system comprising a plurality of optical fibre arrays, each optical fibre array having a cluster of optical fibres with their one ends oriented to transmit electromagnetic radiation into free-space and arranged to receive the electromagnetic radiation from an array input, and the array inputs are connected to receive the electromagnetic radiation in sequence from a source of electromagnetic radiation, in which the optical fibre arrays are arranged as a plurality of array groups, each array group has a respective array group input, and an array group input of one array is connected to an output of another array group.

22. An electromagnetic signal processing system, according to claim 21, in which the connection of the array group input from one array group to the output of the other array group is through an optical delay.

23. An electromagnetic signal processing system comprising a plurality of optical fibre arrays, each optical fibre array having a cluster of optical fibres with their one ends oriented to transmit electromagnetic radiation into free-space and arranged to receive the electromagnetic radiation from an array input, and the array inputs are connected to receive the electromagnetic radiation in sequence from a source of electromagnetic radiation, in which the optical fibres arrays are arranged as a plurality of array groups, each array group has a respective array group input, and an optical switch is arranged operatively between the array group inputs and the source of electromagnetic radiation.

* * * * *